INVENTOR.
GARETH M. DAVIDSON
BY
ATTORNEY.

2,960,645
LEAD NETWORK SERVOSYSTEM

Gareth M. Davidson, Bronx, N.Y., assignor to American Bosch Arma Corporation, a corporation of New York Filed May 1, 1956, Ser. No. 581,913

8 Claims. (Cl. 318—448)

The present invention relates to servomechanism damping devices and has particular reference to means for producing error rate damping.

Error rate damping in a servo system is produced when the controlled output torque is a function of both the error and the time rate of change of error, or when the torque leads the error by some phase angle. Tachometers and various lead networks have been used for this purpose in prior systems. While these have been largely satisfactory there is room for improvement in both operational and physical characteristics of these devices. The tachometer, being mechanical in nature, creates problems of wear, weight space, and cost. Existing phase-lead networks, on the other hand, lack a certain degree of flexibility, particularly in A.C. carrier systems and in systems where a lead angle is required at frequencies appreciably below one cycle per second. The present invention overcomes these drawbacks without sacrifice of any of the advantages of conventional components.

The present invention proposes the use of thermal elements in a feedback loop around the servo amplifier. The thermal element is preferably of the form disclosed in U.S. Patent 2,700,829 for "Circuit Coupling Device." Since the thermal element itself has a lagging characteristic the effect in the feedback loop is to make the overall phase difference a leading one. It is well known that the leading signal can be used for stabilized servo operation.

For a more complete understanding of the invention, reference may be had to the accompanying diagrams, in which.

Figure 1:
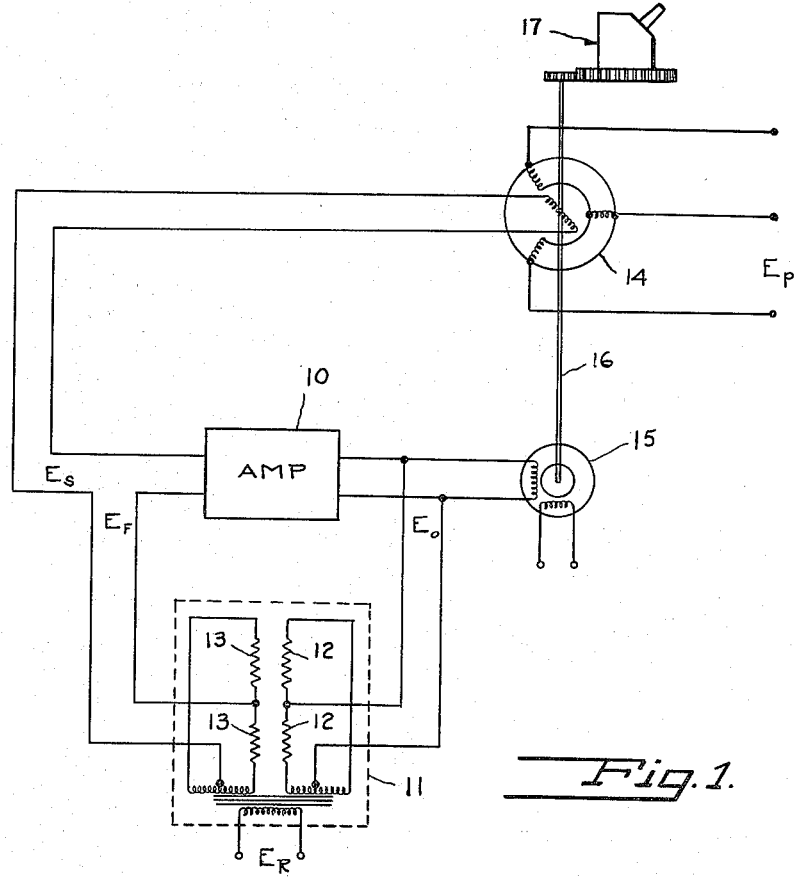
Fig. 1 shows one embodiment of the invention.
Figure 2:
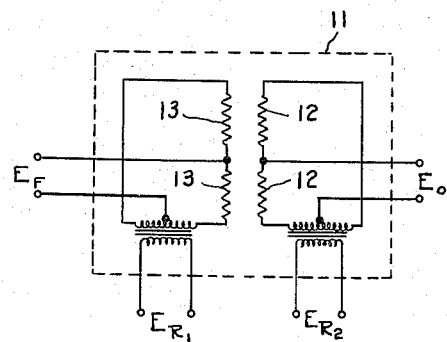
Fig. 2 shows one modification of the thermal element delay device.

In Fig. 1, an actuating signal $E_s$, which may be considered as an amplitude modulated carrier frequency voltage is applied to the input of an amplifier 10 jointly with the output voltage $E_f$ of a thermal coupling device 11, the input voltage to the thermal device 11 being supplied by the output voltage $E_o$ of the amplifier 10. The thermal coupling device 11 is also supplied with a reference voltage $E_r$ of the same frequency as the carrier frequency of $E_s$ and of constant magnitude. If the carrier frequency of $E_o$ is not the same as that of $E_s$, the thermal unit will require two reference voltages as shown in Fig. 2. It is assumed here that the amplifier 10 will contain frequency changing means of some type in this case.

The symbolic representation of the thermal unit and its functional operation is the same as that described in the Patent 2,700,829. Thus, the input signal $E_o$ unbalances the thermal equilibrium of a pair of heater resistors 12 and causes an equivalent unbalance in the values of a pair of heated resistors 13. The unbalance in the resistance values produces an output voltage $E_f$ in the thermal unit 11. For a more complete description of the thermal unit reference should be had to the Patent 2,700,829.

The remainder of the figure illustrates a typical servo system and shows the use of the present invention more clearly. The difference between a command and controlled variable produces an actuating signal $E_s$ in the control element 14 which may be a potentiometer, synchro or other pickoff device. For example, a positional synchro signal $E_p$ may be applied to the three stator windings of a synchro control transformer, and a relative displacement of its rotor, with respect to the field produced by the energized stator windings, will create the actuating signal $E_s$.

The signal $E_s$ is modified by the amplifier 10 and its feedback circuit, and the modified signal $E_o$ is adapted to energize the servo motor 15. Motor 15 drives shaft 16 and thereby positions the load 17 and adjusts the control element 14 until the signal $E_s$ is reduced to zero. At this point the position of shaft 16 agrees with the command signal $E_p$.

It has been shown in Patent 2,700,829 referred to earlier that the transfer function of the thermal unit 10 may be represented by the equation $$\frac{E_f}{E_o} = \frac{K}{1+DT} \qquad (1)$$

where $KE_o$ is the steady state value of $E_f$ and D is the differential operator $d/dt$. It is well known that the overall transfer function of a high gain amplifier is the inverse of the transfer function through the feedback circuit. Thus, it will be seen that $$\frac{E_o}{E_s} = \frac{1+DT}{K} \qquad (2)$$

It will be recognized that the relationship is one which results in an output voltage $E_o$ which leads the actuating signal $E_s$ by some angle dependent upon the time constant T of the device 11 and the value of K. Also, it should be recognized that the introduction of a lead angle between the signals $E_o$ and $E_s$ result in the desired damping effect on servo motor 15.

Figure 3:
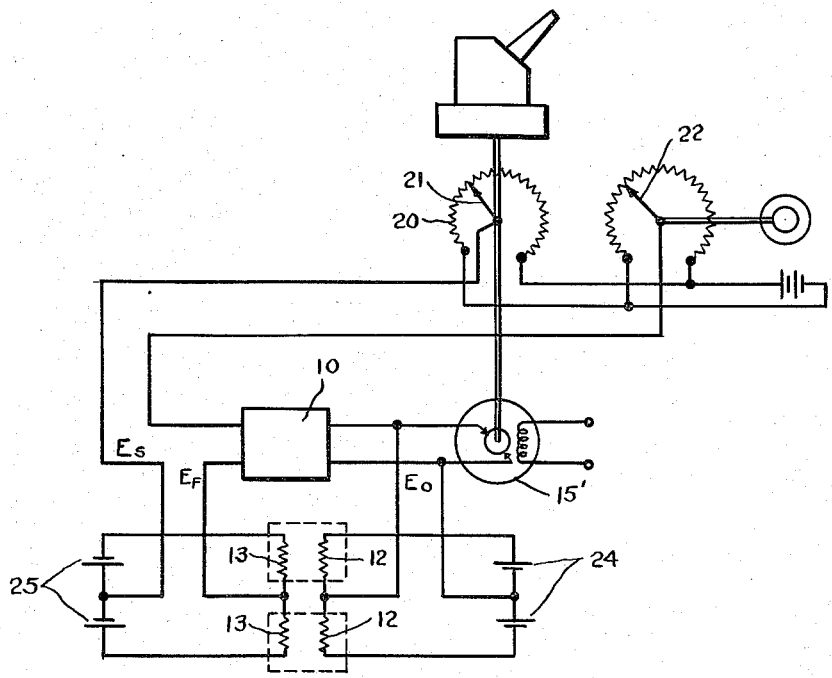
Fig. 3 shows a direct current version of the embodiment in Fig. 1.

It should be emphasized that the invention is not necessarily limited to A.C. use, but is equally well adapted for use in direct current systems. Naturally, in this situation transformers cannot be used, but they may be replaced by the equivalent of center tapped D.C. voltage supplies. Also, the pickoff device must be a type suitable for direct current operation. The direct current system is illustrated in Fig. 3. Here the pickoff device is a resistance potentiometer 20 having a movable brush 21 whose position is made to correspond with a manually displaced brush 22 of a similar potentiometer 23 by the servo system operation. The error signal, $E_s$, is available between the brushes 21, 22. A feedback signal $E_f$ from the feedback circuit is combined with the error signal $E_s$ and the total is applied to the amplifying means 10 which supplies power to the D.C. motor 15'. The signal $E_o$, from amplifier 10, is applied between heater resistors 12 and the center tap of D.C. power supply 24, while the feedback signal $E_f$ is taken between the heated resistors 13, 13 and the center tap of D.C. power supply 25.

Although only two embodiments of the invention have been described in detail, the invention may take many forms within the scope of the appended claims and should not be limited by the illustrative example herein described.

I claim:

1. In an electromechanical servo control system, a servo motor, a shaft operatively connected to and driven by said motor, error detecting means operatively connected to said shaft for indicating the error between actual shaft position and desired shaft position, and connected to said servo motor, amplifying means interposed between said error detecting means and said servo motor, a feedback circuit between the output and the input of said amplifier and thermal means in said feedback circuit whereby the output signal leads the input signal.

2. In an electromechanical servo control system, a servo motor, a shaft operatively connected to and driven by said motor, error detecting means operatively connected to said shaft for indicating the error between actual shaft position and desired shaft position, and connected to said servo motor, amplifying means interposed between said error detecting means and said servo motor, a feedback circuit between the output and the input of said amplifier and thermal means in said feedback circuit whereby the output signal leads the input signal, said thermal means comprising a plurality of sets of resistors, with the resistors of each set being in heat exchange relationship with the other resistors of the same set.

3. In an electromechanical servo control system, a servo motor, a shaft operatively connected to and driven by said motor, error detecting means operatively connected to said shaft for indicating the error between actual shaft position and desired shaft position, and connected to said servo motor, amplifying means interposed between said error detecting means and said servo motor, a feedback circuit between the output and the input of said amplifier and thermal means in said feedback circuit whereby the output signal leads the input signal, said thermal means comprising a plurality of sets of resistors, with the resistors of each set being in heat exchange relationship with the other resistors of the same set, one resistor of each set being connected to the output of said amplifier and another resistor of each set being connected in series with said error detecting means and said amplifier input.

4. In an electromechanical servo control system, a servo motor, a shaft operatively connected to and driven by said motor, error detecting means operatively connected to said shaft and having an output for indicating the error between actual shaft position and desired shaft position, and connected to said servo motor, amplifying means interposed between said error detecting means and said servo motor, a feedback circuit between the output and the input of said amplifier and a thermal lag network in said feedback circuit whereby the output of said amplifier leads the output of said error detecting means.

5. In an electromechanical servo control system, a servo motor, a shaft operatively connected to and driven by said motor, error detecting means operatively connected to said shaft and having an output for indicating the error between actual shaft position and desired shaft position, and connected to said servo motor, amplifying means interposed between said error detecting means and said servo motor, a feedback circuit between the output and the input of said amplifier and a thermal lag network in said feedback circuit whereby the output of said amplifier leads the output of said error detecting means, said thermal lag network comprising a plurality of sets of resistors, with the resistors of each set being in heat exchange relationship with the other resistors of the same set.

6. In an electromechanical servo control system, a servo motor, a shaft operatively connected to and driven by said motor, error detecting means operatively connected to said shaft and having an output for indicating the error between actual shaft position and desired shaft position, and connected to said servo motor, amplifying means interposed between said error detecting means and said servo motor, a feedback circuit between the output and the input of said amplifier and a thermal lag network in said feedback circuit whereby the output of said amplifier leads the output of said error detecting means, said thermal lag network comprising a plurality of sets of resistors, with the resistors of each set being in heat exchange relationship with the other resistors of the same set, one resistor of each set being connected to the output of said amplifier and another resistor of each set being connected in series with said error detecting means and said amplifier input.

7. In a lead network for servo damping apparatus, signal amplifying means having an input and output and negative feedback connections between said output and input and thermal delaying means interposed in said feedback connections whereby the output signal leads the input signal.

8. In a lead network for servo damping apparatus, signal amplifying means having an input and output and negative feedback connections between said output and input and thermal delaying means interposed in said feedback connections whereby the output signal leads the input signal, said thermal delaying means including a first bridge circuit having a pair of resistors adapted to be unequally energized by the amplifier output, a second bridge circuit having a pair of resistors severally in close thermal contact with the several resistors of said first bridge and adapted to be unbalanced by the heat transfer from said first named resistors, and connections from said second bridge to said feedback circuit.

References Cited in the file of this patent

UNITED STATES PATENTS

| | | |
|---|---|---|
| 2,463,805 | Polye et al. | Mar. 8, 1949 |
| 2,477,729 | Fitz Gerald | Aug. 2, 1949 |
| 2,511,855 | Keck et al. | June 20, 1950 |
| 2,632,872 | Warsher | Mar. 24, 1953 |
| 2,700,829 | Statsinger | Feb. 1, 1955 |

OTHER REFERENCES

Ahrendt, William R.: Servomechanism Practice, McGraw-Hill, New York, 1954, p. 97.

Report No. UMM25, Oct. 28, 1948, Aeronautical Research Center, University of Michigan, Figure 8, p. 18, and Figure 10, p. 19-A.

Lauer: Lesnick and Matson, Servomechanism Fundamentals, p. 214, Fig. 9.4, and p. 216, Fig. 9.5; McGraw-Hill, New York, 1947.

Terman: Electronic and Radio Engineering, 4th edition, p. 390, Fig. 11-11; McGraw-Hill, New York, 1955.

Cage and Bashe: Theory and Application of Industrial Electronics, p. 106, Fig. 5-16; McGraw-Hill, New York, 1951.